(12) United States Patent
Wermuth et al.

(10) Patent No.: US 8,191,519 B2
(45) Date of Patent: Jun. 5, 2012

(54) METHOD AND APPARATUS FOR OPERATING AN INTERNAL COMBUSTION ENGINE

(75) Inventors: Nicole Wermuth, Ann Arbor, MI (US); Paul M. Najt, Bloomfield Hills, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 526 days.

(21) Appl. No.: 12/429,420

(22) Filed: Apr. 24, 2009

(65) Prior Publication Data

US 2010/0269771 A1    Oct. 28, 2010

(51) Int. Cl.
*F01L 1/34* (2006.01)

(52) U.S. Cl. .................. 123/90.16; 123/90.15

(58) Field of Classification Search .............. 123/90.15, 123/90.16, 90.31, 90.17
See application file for complete search history.

(56) References Cited

U.S. PATENT DOCUMENTS

| | | | |
|---|---|---|---|
| 5,090,364 A | 2/1992 | McCarroll et al. | |
| 7,036,483 B2 | 5/2006 | El Tahdry et al. | |
| 7,128,047 B2 | 10/2006 | Kuo et al. | |
| 7,152,559 B2 | 12/2006 | Kuo et al. | |
| 2006/0144356 A1* | 7/2006 | Sellnau et al. | 123/90.16 |
| 2006/0196466 A1 | 9/2006 | Kuo et al. | |
| 2006/0243241 A1 | 11/2006 | Kuo et al. | |

* cited by examiner

*Primary Examiner* — Zelalem Eshete (57) ABSTRACT

An internal combustion engine includes intake and exhaust camshafts including high-lift lobes and low-lift lobes separated by a lobe separation angle. The engine transitions between operating in a controlled auto-ignition combustion mode with positive valve overlap and a controlled auto-ignition combustion mode with negative valve overlap solely by selecting the corresponding one of the high-lift lobes and the low-lift lobes.

13 Claims, 4 Drawing Sheets

METHOD AND APPARATUS FOR OPERATING AN INTERNAL COMBUSTION ENGINE

TECHNICAL FIELD

This disclosure relates to operation and control of internal combustion engines.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous spark-ignition (SI-H) combustion mode and a stratified-charge spark-ignition (SC-SI) combustion mode. When operating in the homogeneous spark-ignition (SI-H) combustion mode, an engine intake valve for each cylinder opens after TDC and a corresponding exhaust valve closes after TDC, creating a positive valve overlap (PVO) period in which both the exhaust and intake valves are open.

SI engines can be configured to operate in a homogeneous-charge compression-ignition (HCCI) combustion mode, also referred to interchangeably as controlled auto-ignition (HCCI) combustion, under predetermined speed/load operating conditions. The controlled auto-ignition (HCCI) combustion comprises a distributed, flameless, auto-ignition combustion process that is controlled by oxidation chemistry. An engine operating in the controlled auto-ignition (HCCI) combustion mode has a cylinder charge that is preferably homogeneous in composition, temperature, and residual exhaust gases at intake valve closing time. Controlled auto-ignition (HCCI) combustion is a distributed kinetically-controlled combustion process with the engine operating at a dilute air/fuel mixture, i.e., lean of an air/fuel stoichiometric point, with relatively low peak combustion temperatures, resulting in low nitrous oxides (NOx) emissions. The homogeneous air/fuel mixture minimizes occurrences of rich zones that form smoke and particulate emissions.

Controlled auto-ignition (HCCI) combustion depends upon factors including cylinder charge composition, temperature, and pressure at intake valve closing. The control inputs to the engine are coordinated to facilitate robust auto-ignition combustion. Controlled auto-ignition (HCCI) combustion strategies may include using an exhaust recompression valve strategy. The exhaust recompression valve strategy includes adjusting timing of the intake and exhaust valves relative to TDC to control a cylinder charge temperature by trapping residual gas from a previous engine cycle. In operation, the exhaust valve closes before TDC and the corresponding intake valve opens after TDC creating a negative valve overlap (NVO) period in which both the exhaust and intake valves are closed, thereby trapping the exhaust gas. The opening timings of the intake and exhaust valves are preferably symmetrical relative to TDC. Both a cylinder charge composition and temperature are affected by the exhaust valve closing timing. In particular, more hot residual gas from a previous cycle can be retained with earlier closing of the exhaust valve leaving less room for incoming fresh air mass, thereby increasing cylinder charge temperature and decreasing cylinder oxygen concentration.

Different combustion modes in similar speed/load situations can have performance differences relating to engine stability, emissions, and fuel economy. Engine operation can include transitioning to a particular combustion mode having a preferred performance in a particular situation. Selecting a preferred combustion mode in which to operate can be based upon which combustion mode results in preferred performance at a particular engine load and speed. When a change in speed and/or engine load warrants a transition to a different combustion mode, a transition strategy will be performed and the engine will transition to the different combustion mode.

Known challenges associated with transitioning engine operation between combustion modes include incomplete combustion, engine misfires, torque disturbances, and increased undesirable emissions.

SUMMARY

A spark-ignition direct injection internal combustion engine includes intake and exhaust camshafts and intake and exhaust valves. A method for controlling the engine includes providing a low-lift intake lobe and a high-lift intake lobe on the intake camshaft. The low-lift intake lobe and the high-lift intake lobe are separated by a predetermined intake lobe separation angle. Similarly, a low-lift exhaust lobe and a high-lift exhaust lobe are provided on the exhaust camshaft and are separated by a predetermined exhaust lobe separation angle. The engine is operated in a controlled auto-ignition combustion mode with a positive valve overlap using the high-lift intake and exhaust lobes, and operated in the controlled auto-ignition combustion mode with a negative valve overlap using the low-lift intake and exhaust lobes. Transitioning between these operating modes is accomplished solely by switching between using the high-lift intake and exhaust lobes and the low-lift intake and exhaust lobes.

BRIEF DESCRIPTION OF THE DRAWINGS

One or more embodiments will now be described, by way of example, with reference to the accompanying drawings, in which.

DETAILED DESCRIPTION

Figure 1:
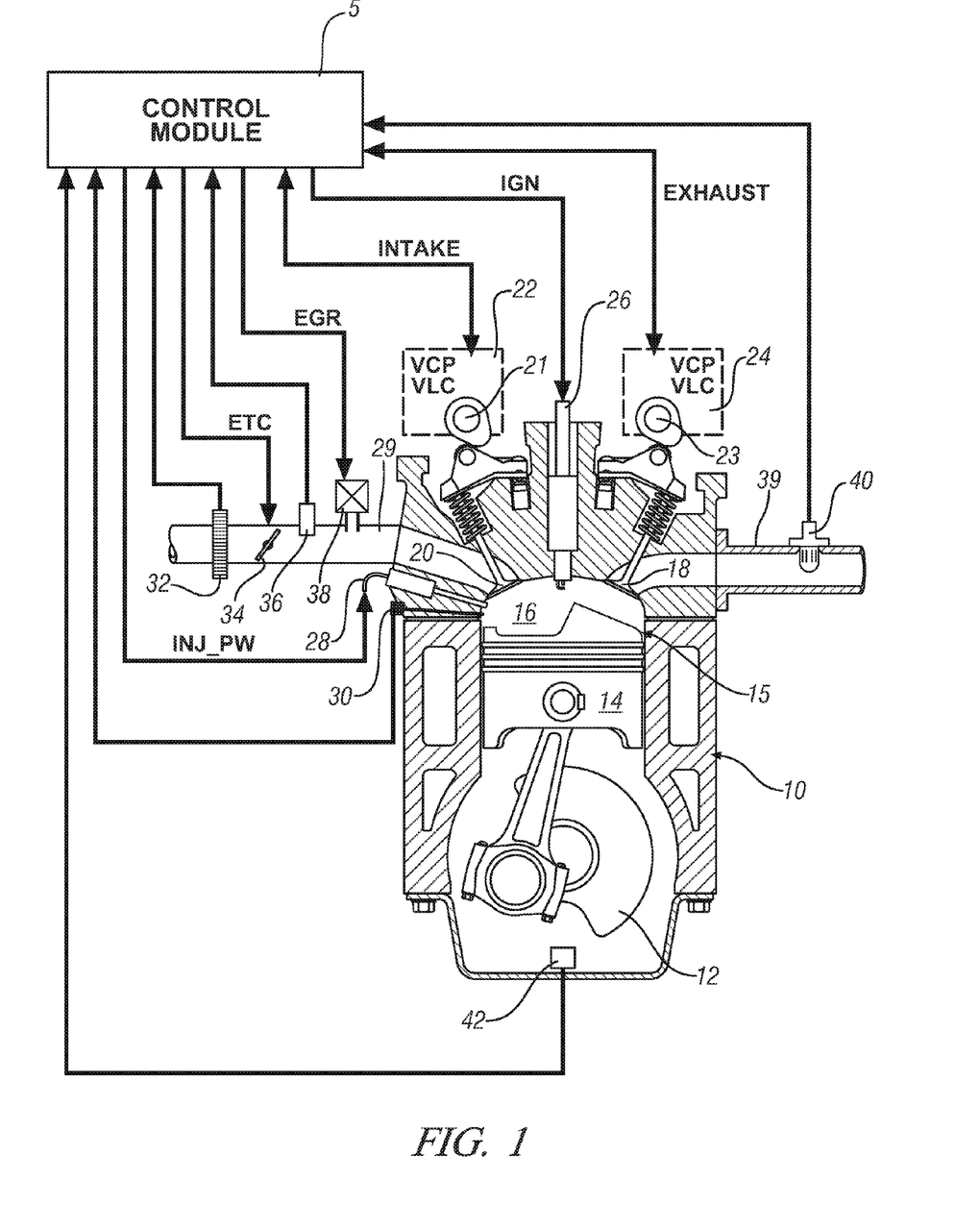
FIG. 1 is a schematic drawing of an exemplary engine system, in accordance with the present disclosure.

Referring now to the drawings, wherein the depictions are for the purpose of illustrating certain exemplary embodiments only and not for the purpose of limiting the same, FIG. 1 is a schematic drawing of an embodiment of an engine 10 that is illustrative of the concepts described herein. The exemplary engine 10 is selectively operative in a plurality of combustion modes including a controlled auto-ignition (HCCI) combustion mode and a homogeneous spark-ignition (SI-H)

combustion mode. Each combustion mode may be associated with one or more fuel injection strategies, e.g., a single and/or a multiple injection fuel injection strategy for the controlled auto-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles and can be controlled using the control module 5 described with reference to FIG. 1.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system comprises airflow ductwork and devices for monitoring and controlling the airflow. The air intake devices preferably include a mass airflow sensor 32 for monitoring mass airflow and intake air temperature. A throttle valve 34 preferably comprises an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38 in one embodiment. The control module 5 is operative to control mass flow of exhaust gas to the intake manifold 29 by controlling opening of the EGR valve 38.

Airflow from the intake manifold 29 into each combustion chamber 16 is controlled by one or more intake valve(s) 20. Exhaust flow out of each combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14. The intake and exhaust camshafts 21 and 23 are described hereinbelow with reference to FIGS. 2A and 2B.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably comprises a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 preferably include controllable two-step variable lift control (VLC) mechanisms configured to control magnitude of valve lift, or opening, of the intake and exhaust valve(s) 20 and 18, respectively, to one of two discrete states. The two discrete states preferably include a low-lift state resulting in a low-lift valve open position (about 4-6 mm in one embodiment) preferably associated with load speed, low load operation, and a high-lift state resulting in a high lift valve open position (about 8-13 mm in one embodiment) preferably associated with high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of rotation of the crankshaft 12, thus permitting the control module 5 to advance or retard opening and closing of one of intake and exhaust valve(s) 20 and 18 relative to the position of the piston 14 for each cylinder 15. The range of phasing authority is defined and limited by the intake and exhaust VCP/VLC devices 22 and 24. The intake and exhaust VCP/VLC devices 22 and 24 include camshaft position sensors (not shown) to determine rotational positions of the intake and the exhaust camshafts 21 and 23. The intake and exhaust VCP/VLC devices 22 and 24 are actuated using one of electro-hydraulic, hydraulic, and electric control force, controlled by the control module 5.

The engine 10 includes a fuel injection system, comprising a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system (not shown). The engine 10 includes a spark-ignition system (not shown) by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed in one embodiment, a combustion sensor 30 configured to monitor combustion, and an exhaust gas sensor 40 configured to monitor exhaust gases, typically an air/fuel ratio sensor. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

During engine operation in the controlled auto-ignition (HCCI) combustion modes, the throttle valve 34 is preferably substantially wide-open with the engine 10 controlled at a lean air/fuel ratio. Substantially wide-open throttle can include operating fully un-throttled, or slightly throttled to create a vacuum in the intake manifold 29 to effect EGR flow. In one embodiment, in-cylinder EGR mass is controlled to a high dilution rate, e.g., greater than 40% of a cylinder charge. One or more fuel injection events can be executed during an engine cycle including at least one injection during a compression phase.

During engine operation in the homogeneous spark-ignition (SI-H) combustion mode, the throttle valve 34 is controlled to regulate the airflow. The engine 10 is controlled to a stoichiometric air/fuel ratio, and the intake and exhaust valves 20 and 18 are in the high-lift valve open position and the intake and exhaust lift timing operate with a positive valve overlap. A fuel injection event is executed during compression phase of an engine cycle, preferably substantially before TDC. Spark ignition is preferably discharged at a predetermined time subsequent to the fuel injection when air charge within the cylinder is substantially homogeneous.

The control module 5 executes algorithmic code stored therein to control the aforementioned actuators to form the cylinder charge, including controlling the aforementioned actuators to preferred states for throttle position, spark-ignition timing, fuel injection mass and timing, EGR valve position to control flow of recirculated exhaust gases on engines so equipped, and timing, lift and phasing of the intake and exhaust valves 20 and 18. The control module 5 can operate to turn the engine 10 on and off during ongoing vehicle operation, and can operate to selectively deactivate a portion of the combustion chambers 15 or a portion of the intake and exhaust valves 20 and 18 through control of fuel, spark and valve activation. The control module 5 can control air/fuel ratio based upon feedback from the exhaust gas sensor 40.

Controlling the timing, lift, and phasing of the intake and exhaust valves 20 and 18 can include negative valve overlap (NVO) and positive valve overlap (PVO). In negative valve overlap (NVO), the intake and exhaust VCP/VLC devices 22 and 24 are controlled to the low-lift state and cam phasing is controlled to cause the exhaust valve 18 to close before TDC and cause the intake valve 20 to subsequently open after TDC, creating a negative valve overlap (NVO) period in which both the intake and exhaust valves 20 and 18 are closed, thereby trapping exhaust gas in the combustion chamber 16. In positive valve overlap (PVO), the intake and exhaust VCP/VLC devices 22 and 24 are controlled to the high-lift state and cam phasing angle is controlled to cause the exhaust valve 18 to close after TDC and cause the intake valve 20 to open prior to TDC, creating a positive valve overlap (PVO) period in which both the intake and exhaust valves 20 and 18 are open. Residual exhaust gas can be retained and recaptured in the combustion chamber 16 during engine operation in the PVO period.

Figure 2A:
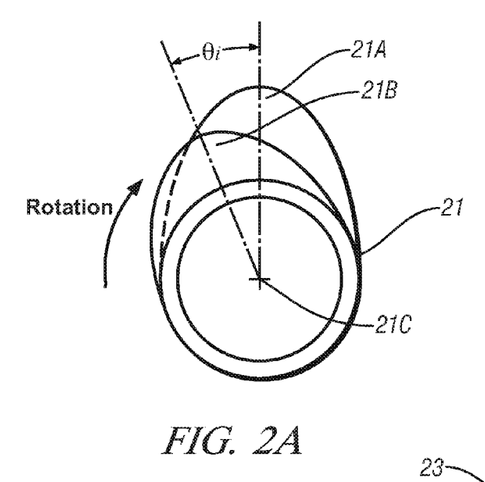
FIGS. 2A and 2B are schematic drawings of exemplary camshafts, in accordance with the present disclosure.

FIG. 2A shows a schematic side-view of an exemplary intake camshaft 21 including a plurality of sets of high-lift lobe(s) 21A and corresponding low-lift lobe(s) 21B having a common axis 21C of rotation that are machined into the intake camshaft 21. Each set of high-lift lobe(s) 21A and corresponding low-lift lobe(s) 21B is associated with one of the cylinders 15 of the engine 10. There can be multiple high-lift lobes 21A and corresponding low-lift lobes 21B for each cylinder 15 when there are multiple intake valves 20 per cylinder 15. A direction of rotation about the camshaft axis 21C is shown (Rotation). When the intake camshaft 21 rotates, the high-lift lobe(s) 21A interacts with the corresponding intake valve(s) 20 to effect the high-lift valve open position with the intake VCP/VLC device 22 controlled to the high-lift state. The low-lift lobe(s) 21B interact with the corresponding intake valve(s) 20 to effect the low-lift valve open position when the intake VCP/VLC device 22 is controlled to the low-lift state. In one embodiment, the intake VCP/VLC device 22 may include a rocker arm and follower that are selectively coupled and decoupled by a hydraulically actuated pin. When coupled, the rocker arm and follower move in unison. When decoupled, the rocker arm and follower are decoupled and move independently. In such an exemplary arrangement, the rocker arm is linked to an intake valve which is opened and closed in accordance with its motion. The follower is not coupled to an intake valve and operates with lost motion unless coupled to rocker arm through the pin. The high-lift lobe 21A causes actuation of the intake valve via the follower linked by the pin to the rocker arm. Such lobe selection mechanisms are well known in the art of gasoline fueled engines. Other lost motion types of mechanisms are also known for engaging and disengaging rocker arms and followers to selectively operate in unison or independently. Other mechanisms are known in the art for selectively actuating valves through alternatively applied cam lobes.

There is an intake lobe separation angle, or offset angle, $\theta i$ between the peak or maximum lift positions of the high-lift lobes 21A and the low-lift lobes 21B. While the lobe separation angle is described herein as being measured relative to peak lobe positions, one having ordinary skill in the art will recognize that the lobe separation angle may also be measured with respect to valve opening and closing angles or lobe midpoints (which may or may not coincide with lobe peak positions for example in embodiments employing asymmetrical cams). In one embodiment, the intake lobe separation angle $\theta i$ between the peak positions of the high-lift lobes 21A and corresponding low-lift lobes 21B is an angular rotation of 22° cam angle, which corresponds to an angular rotation of 44° crank angle (° CA). The peak position of the high-lift lobe(s) 21A is rotationally offset to precede the peak position of the low-lift lobe(s) 21B during rotation of the intake camshaft 21. The cam phasing portion of the intake VCP/VLC device 22 is used to control the timing of the peak positions of the intake valves 20 relative to TDC of the corresponding piston 14 for the corresponding combustion chamber 16. Thus, switching the intake VCP/VLC device 22 from the high-lift state to the low-lift state retards the intake valve timing.

Figure 2B:
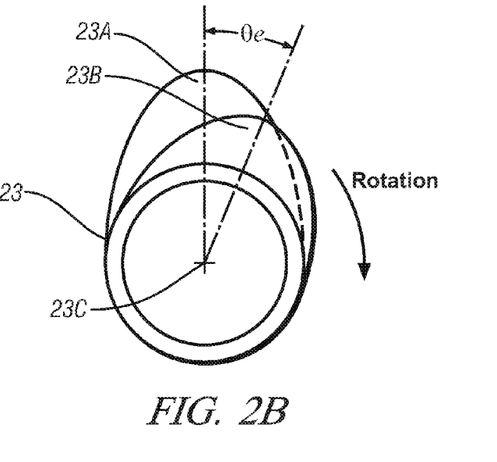

FIG. 2B shows a schematic side-view of an exemplary exhaust camshaft 23 including a plurality of sets of high-lift lobe(s) 23A and corresponding low-lift lobe(s) 23B having a common axis 23C of rotation that are machined into the exhaust camshaft 23. Each set of high-lift lobe(s) 23A and corresponding low-lift lobe(s) 23B is associated with one of the cylinders 15 of the engine 10. There can be multiple high-lift lobes 23A and corresponding low-lift lobes 23B for each cylinder 15 when there are multiple exhaust valves 18 per cylinder 15. A direction of rotation about the camshaft axis 23C is shown (Rotation). When the exhaust camshaft 23 rotates, the high-lift lobe(s) 23A interacts with the corresponding exhaust valve(s) 18 to effect the high-lift valve open position with the exhaust VCP/VLC device 24 controlled to the high-lift state. Furthermore, the low-lift lobe(s) 23B interact with the corresponding exhaust valve(s) 18 to effect the low-lift valve open position when the exhaust VCP/VLC device 24 is controlled to the low-lift state. Similar to the above description with respect to the intake camshaft 21, the exhaust VCP/VLC device 24 may include a lost motion type of mechanism to engage and disengage rocker arms and followers for selectively operating the exhaust valve in accordance with one or the other of the high-lift and low-lift lobes.

There is an exhaust lobe separation angle, or offset angle, θe between the peak positions of the high-lift lobes 23A and the low-lift lobes 23B. Again, as with the intake lobes, while the lobe separation angle is described herein as being measured relative to peak lobe positions, one having ordinary skill in the art will recognize that the lobe separation angle may also be measured with respect to valve opening and closing angles or lobe midpoints (which may or may not coincide with lobe peak positions for example in embodiments employing asymmetrical cams). In one embodiment, the exhaust rotational offset angle θe between the peak positions on the exhaust camshaft 23 is an angular rotation of 22° cam angle, which corresponds to an angular rotation of 44° crank angle (° CA). The peak position of the high-lift lobe(s) 23A is rotationally offset to follow the peak position of the low-lift lobe(s) 23B during rotation of the exhaust camshaft 23. The cam phasing portion of the exhaust VCP/VLC device 24 is used to control the peak positions of the exhaust valves 18 relative to TDC of the piston 14 for the corresponding combustion chamber 16. Thus, switching the exhaust VCP/VLC device 24 from the high-lift state to the low-lift state advances the exhaust valve timing.

The magnitude of the intake rotational offset angle θi is equal to the magnitude of the exhaust rotational offset angle θe in one embodiment, although it is understood that the intake and exhaust rotational offset angles θi and θe may vary and depend upon factors affecting airflow through the intake and exhaust valves 20 and 18, including the opening diameters, lift magnitudes, and arrangement and quantities of the intake and exhaust valves 20 and 18.

Figure 3:
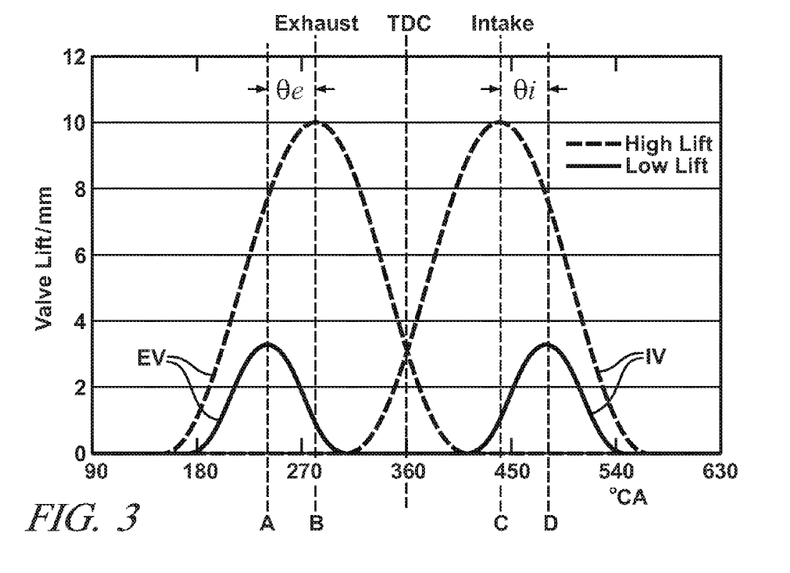
FIG. 3 is a graphical illustration of intake and exhaust valve timing, in accordance with the present disclosure.

FIG. 3 shows a valve lift timing chart comprising graphical depictions of openings and corresponding closings of intake valves 20 (IV) and exhaust valves 18 (EV) as a function of timing in crank angle degrees (° CA) and magnitude of valve lift (Valve Lift/mm). The valve lift timing chart is for an exemplary engine 10 described with reference to FIG. 1 that has been equipped with an intake camshaft 21 and an exhaust camshaft 23 described with reference to FIGS. 2A and 2B. Openings and closings of the intake and exhaust valves 20 and 18 are shown with the intake and exhaust VCP/VLC devices 22 and 24 in the low-lift state and high-lift state. The intake and exhaust cam phasing angles are set at preferred cam phasing angles for the low-lift and the high-lift states. Point A depicts the crank angle at which the exhaust valve 18 reaches the peak open point in the low-lift valve open position, and point B depicts the crank angle at which the exhaust valve 18 reaches the peak open point in the high-lift valve open position. The difference between points A and B in crank angle degrees corresponds to the exhaust lobe separation angle, or offset angle, θe. Thus, the peak position of the high-lift lobe 23A is retarded relative to the peak position of the low-lift lobe 23B for the exhaust camshaft 23 relative to a top-dead-center position of the corresponding moveable piston 14. In one embodiment, the peak position of the high-lift lobe 23A for the exhaust camshaft 23 is retarded by 44° CA. Point C depicts the crank angle at which the intake valve 20 reaches the peak open point in the high-lift valve open position, and point D depicts the crank angle at which the intake valve 20 reaches the peak open point in the low-lift valve open position. The difference between points C and D in crank angle degrees corresponds to the intake lobe separation angle, or offset angle, θi. Thus, the peak position of the high-lift lobe 21A is advanced relative to the peak position of the low-lift lobe 21B for the intake camshaft 21 relative to the top-dead-center position of the corresponding moveable piston 14. In one embodiment the peak position of the high-lift lobe 21A for the intake camshaft 21 advanced by 44° CA. The intake and exhaust cam phasing angles for the low-lift and the high-lift valve open positions as depicted in FIG. 3 comprise preferred cam phasing angles for switching the intake and exhaust VCP/VLC devices 22 and 24 between the low-lift state and the high-lift state.

Figure 4:
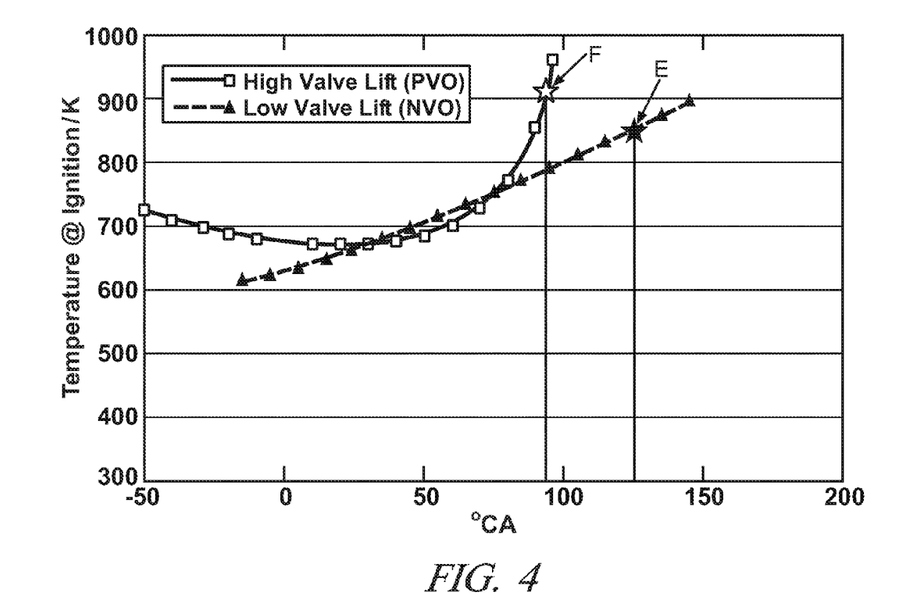
FIGS. 4 and 5 are graphical illustrations of combustion parameters as a function of valve overlap, in accordance with the present disclosure.

FIG. 4 graphically shows in-cylinder gas temperature at the time of ignition as a function of valve overlap, in elapsed crank angle degrees of overlap (° CA), for an exemplary engine constructed in accordance with an embodiment described hereinabove. The first line (Low Valve Lift) indicates elapsed negative valve overlap (NVO) and the second line (High Valve Lift) indicates elapsed positive valve overlap (PVO). The first line (Low Valve Lift) shows in-cylinder gas temperature at the time of ignition as a function of elapsed crank angle degrees of negative valve overlap (NVO) with the intake and exhaust VCP/VLC devices 22 and 24 operating at the low-lift states, over a range of NVO from 0° CA to 150° CA. The second line (High Valve Lift) shows in-cylinder gas temperature at the time of ignition as a function of elapsed crank angle degrees of positive valve overlap (PVO) with the intake and exhaust VCP/VLC devices 22 and 24 operating at the high-lift states over a range of PVO from −50° CA to +100° CA. Point E represents an operating point on the first line (Low Valve Lift) and shows in-cylinder gas temperature at the time of ignition as a function of crank angle degrees of elapsed negative valve overlap (NVO) with the intake and exhaust VCP/VLC devices 22 and 24 operating at the low-lift states. Point F represents an operating point on the second line (High Valve Lift) and shows in-cylinder gas temperature at the time of ignition as a function of elapsed crank angle degrees of positive valve overlap (PVO) with the intake and exhaust VCP/VLC devices 22 and 24 operating at the high-lift states. Both Point E and Point F depict engine operation at the same preferred cam phasing angle, with the intake and exhaust valves 20 and 18 switching between the high-lift valve open position and the low-lift valve open position.

Figure 5:
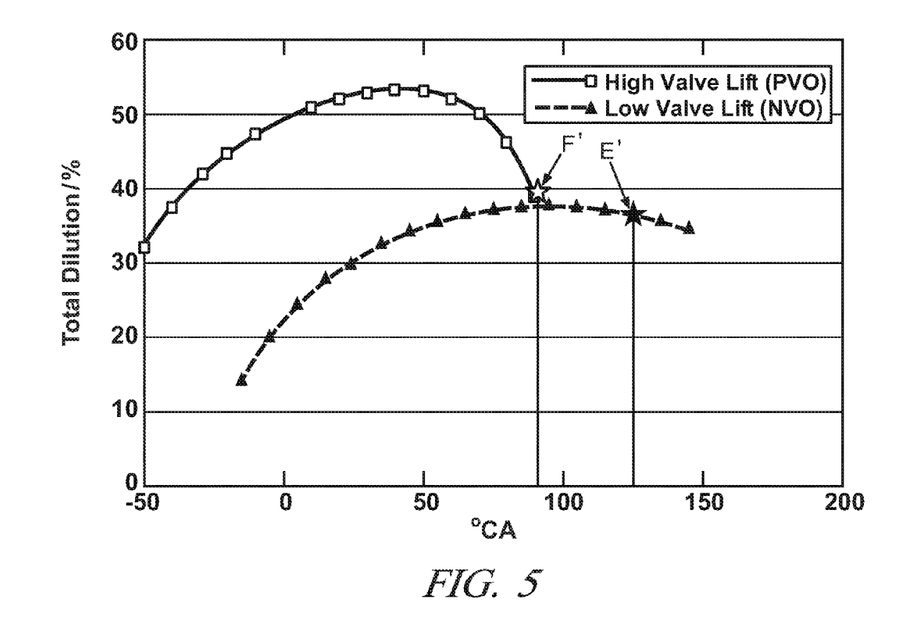

FIG. 5 graphically shows in-cylinder charge dilution (%) at the time of ignition as a function of valve overlap, in crank angle degrees (° CA) for an exemplary engine constructed in accordance with an embodiment described hereinabove. The first line (Low Valve Lift) indicates elapsed negative valve overlap (NVO) and the second line (High Valve Lift) indicates elapsed positive valve overlap (PVO). The first line (Low Valve Lift) shows in-cylinder charge dilution (%) at the time of ignition as a function of elapsed crank angle degrees of negative valve overlap (NVO) with the intake and exhaust VCP/VLC devices 22 and 24 operating at the low-lift states over a range of NVO from 0° CA to 150° CA. The second line (High Valve Lift) shows in-cylinder charge dilution (%) at the time of ignition as a function of elapsed crank angle degrees of positive valve overlap (PVO) with the intake and exhaust VCP/VLC devices 22 and 24 operating at the high-lift states over a range of PVO from −50° CA to +100° CA. Point E' represents an operating point on the first line (Low Valve Lift) and shows in-cylinder charge dilution (%) at the time of ignition as a function of elapsed negative valve overlap (NVO) with the intake and exhaust VCP/VLC devices 22 and 24 operating at the low-lift states. Point F' represents an operating point on the second line (High Lift) and shows in-cylinder charge dilution (%) at the time of ignition as a function of elapsed crank angle degrees of positive valve overlap (PVO) with the intake and exhaust VCP/VLC devices 22 and 24 operating at the high-lift states. Both Point E' and Point F' depict engine operation at the same preferred cam phasing angle, with the intake and exhaust valves 20 and 18 switching between the high-lift valve open position and the low-lift valve open position. Point E' and Point F' correspond to Point E and Point F, respectively, of FIG. 4. The preferred cam phasing angles corresponding to each of the illustrated points E, F, E' and F' are the same.

A thermodynamic state of a cylinder charge can be described in terms of the in-cylinder gas temperature at the time of ignition and the in-cylinder charge dilution (%). FIGS. 4 and 5 illustrate that an engine 10 configured as described hereinabove can achieve a substantially similar thermodynamic state of a cylinder charge when operating the engine 10 with the intake and exhaust VCP/VLC devices 22 and 24 at the high-lift states with PVO and when operating the engine 10 with the intake and exhaust VCP/VLC devices 22 and 24 at the low-lift states with NVO at specific cam phasing set points for the intake and exhaust VCP/VLC devices 22 and 24. Thus, the combination of the high- and low-lift intake and exhaust cam profiles, the respective intake and exhaust lobe separation angles, and the cam phasing angle can be used to establish substantially equivalent in-cylinder temperature at the time of ignition and in-cylinder charge dilution. Since the high- and low-lift intake and exhaust cams have fixed profiles, and the intake and exhaust lobe separation angles are also static, the substantially equivalent in-cylinder temperature and in-cylinder charge dilution can be readily effected within certain predetermined cam phasing angles establishable in the present embodiment by VCP/VLC devices 22 and 24. Therefore, as can now be appreciated, the engine 10 can transition between operating in the controlled auto-ignition (HCCI) combustion mode at the high-lift valve open position with PVO and operating in the controlled auto-ignition (HCCI) combustion mode at the low-lift valve open position with NVO when the engine is operating at predetermined cam phasing set points solely by simultaneously transitioning the intake and exhaust VCP/VLC devices 22 and 24 between the low-lift states and the high-lift states. The engine 10 executes the transition without relying upon adjusting cam phasing angles or adjusting throttle opening or adjusting other engine actuators having attendant delays in timing and combustion stability risks associated therewith. This can facilitate an expanded speed/load operating range for the controlled auto-ignition (HCCI) combustion mode.

Figure 6:
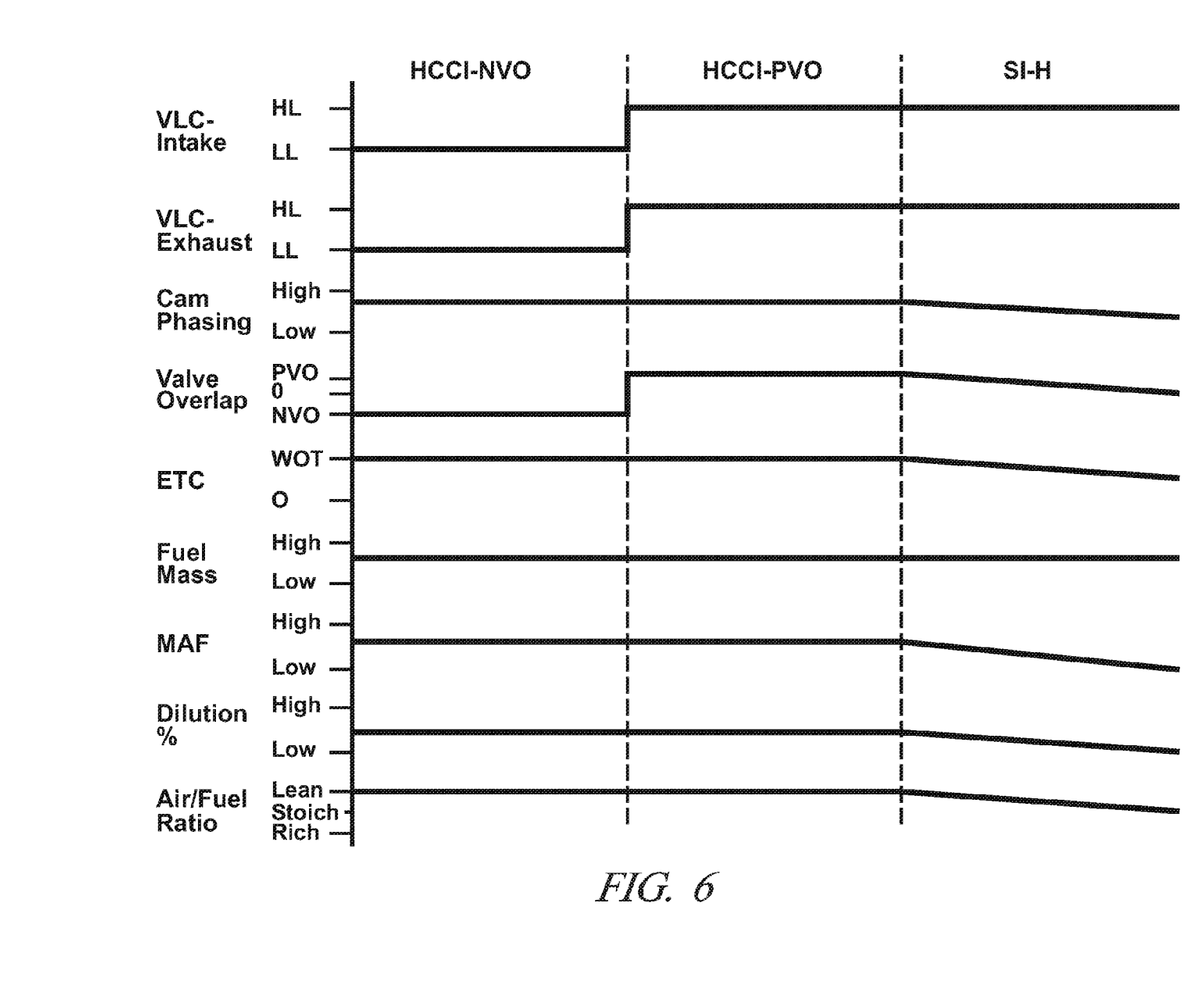
FIG. 6 is a graphical illustration of engine operating parameters, in accordance with the present disclosure.

FIG. 6 shows states for engine actuators and corresponding engine operating states for an exemplary engine transitioning between operating in the controlled auto-ignition (HCCI) combustion mode at the low-lift valve open position with NVO (HCCI-NVO), at the high-lift valve open position with PVO (HCCI-PVO), and the homogeneous spark-ignition (SI-H) combustion mode. States for engine actuators include the intake and exhaust VLC devices 22 and 24 (VLC-Intake, VLC-Exhaust) operating at one of the low-lift state (LL) and the high-lift state (HL), cam phasings (Cam Phasing) of the intake and exhaust VCP devices 22 and 24 over a range between maximum (High) and minimum (Low), valve overlap (Valve Overlap) over a range between PVO and NVO, throttle valve 34 angle (ETC) over a range from a wide open throttle position (WOT) to a closed throttle position (O), and the injected fuel mass (Fuel Mass) from the fuel injector 28. Corresponding engine operating states include cylinder charge dilution (Dilution %), engine mass airflow (MAF), and engine air/fuel ratio (Air/Fuel Ratio) over a range from lean to stoichiometry to rich air/fuel ratio. In a transition between operating in the controlled auto-ignition (HCCI) combustion mode at the low-lift state with NVO (HCCI-NVO) and at the high-lift state with PVO (HCCI-PVO), when the intake and exhaust VLC devices simultaneously transition between the low-lift states (LL) and the high-lift states (HL), and the cam phasing angles of the intake and exhaust VCP devices are held at a preferred phasing angle, the throttle valve angle 34 is held at WOT and injected fuel mass is held constant, the cylinder charge dilution (Dilution %), engine mass airflow (MAF), and the air/fuel ratio are unchanged. The valve overlap transitions between NVO and PVO when the intake and exhaust VLC devices transition. When the engine 10 is operating at the high-lift state with PVO (HCCI-PVO), it can transition to operating in the homogeneous spark-ignition (SI-H) combustion mode by adjusting cam phasing, injection timing, and activating spark ignition. During a subsequent transition to operating in the homogeneous spark-ignition (SI-H) combustion mode, states for the engine actuators may change depending upon other operating conditions and changes in the engine operating states, as is shown. This includes operating at an air/fuel ratio that is lean of stoichiometry, and alternatively, transitioning to operating at stoichiometry.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a spark-ignition direct injection internal combustion engine including intake and exhaust camshafts and intake and exhaust valves, the method comprising:
   providing a low-lift intake lobe and a high-lift intake lobe on the intake camshaft, said low-lift intake lobe and said high-lift intake lobe separated by a predetermined intake lobe separation angle;
   providing a low-lift exhaust lobe and a high-lift exhaust lobe on the exhaust camshaft, said low-lift exhaust lobe and said high-lift exhaust lobe separated by a predetermined exhaust lobe separation angle;
   operating the engine in a controlled auto-ignition combustion mode with a positive valve overlap using the high-lift intake and exhaust lobes;
   operating the engine in the controlled auto-ignition combustion mode with a negative valve overlap using the low-lift intake and exhaust lobes; and
   transitioning between operating the engine in the controlled auto-ignition combustion mode with positive valve overlap and the controlled auto-ignition combustion mode with negative valve overlap solely by switching between using the high-lift intake and exhaust lobes and the low-lift intake and exhaust lobes.

2. The method of claim 1, wherein switching between using the high-lift intake and the low-lift intake lobes and switching between using the high-lift exhaust and the low-lift exhaust lobes are effected simultaneously.

3. The method of claim 2, further comprising transitioning from operating the engine in the controlled auto-ignition combustion mode with a negative valve overlap using the low-lift intake and exhaust lobes to operating the engine in a spark-ignition combustion mode using the high-lift intake and exhaust lobes by intermediately operating the engine in the controlled auto-ignition combustion mode with a positive valve overlap using the high-lift intake and exhaust lobes.

4. The method of claim 2, further comprising transitioning from operating the engine in a spark-ignition combustion mode using the high-lift intake and exhaust lobes to operating the engine in the controlled auto-ignition combustion mode with a negative valve overlap using the low-lift intake and exhaust lobes by intermediately operating the engine in the controlled auto-ignition combustion mode with a positive valve overlap using the high-lift intake and exhaust lobes.

5. The method of claim 1 wherein transitions between operating the engine in the controlled auto-ignition combustion mode and the controlled auto-ignition combustion mode are effected at predetermined intake and exhaust camshaft phasings.

6. An internal combustion engine including variable volume combustion chambers defined by moveable pistons connected to a crankshaft rotationally connected to intake and exhaust camshafts operative to actuate intake and exhaust engine valves, comprising:
   the intake and exhaust camshafts each including high-lift lobes and corresponding low-lift lobes, the high-lift lobes each including a peak position rotationally offset from a peak position of the corresponding low-lift lobe by a predetermined angle, wherein the peak position of the high-lift lobe is retarded relative to the peak position of the low-lift lobe for the exhaust camshaft and the peak position of the high-lift lobe is advanced relative to the peak position of the low-lift lobe for the intake camshaft;
   intake and exhaust variable valve lift control devices configured for selective engagement of one of the high-lift lobes and the corresponding low-lift lobes of the intake and exhaust camshafts to control magnitudes of valve lift of the intake and exhaust valves to one of high-lift valve open positions and low-lift valve open positions;
   the engine configured to achieve a first thermodynamic state with a positive valve overlap when the intake and exhaust variable valve lift control devices control the intake and exhaust valves to the high-lift valve open positions and configured to achieve the first thermodynamic state with a negative valve overlap when the intake and exhaust variable valve lift control devices control the intake and exhaust valves to the low-lift valve open positions, the high-lift and low-lift valve open positions having identical predetermined intake and exhaust cam phasing angles where the first thermodynamic state is achieved.

7. The internal combustion engine of claim 6, wherein the peak position of the high-lift lobe for the intake camshaft is advanced by at least forty degrees of crank angle rotation.

8. The internal combustion engine of claim 6, wherein the peak position of the high-lift lobe for the exhaust camshaft is retarded by at least forty degrees of crank angle rotation.

9. The internal combustion engine of claim 6, further comprising variable cam phasing systems configured to control phasings of the intake and exhaust valves.

10. The internal combustion engine of claim 6, further comprising the engine configured to achieve the first thermodynamic state comprising a first cylinder charge dilution and a combustion charge ignition temperature with a positive valve overlap when the intake and exhaust variable valve lift control devices control the intake and exhaust valves to the high-lift valve open positions and with a negative valve overlap when the intake and exhaust variable valve lift control devices control the intake and exhaust valves to the low-lift valve open positions, the high-lift and low-lift valve open positions having identical predetermined intake and exhaust cam phasing angles where the first thermodynamic state is achieved.

11. The internal combustion engine of claim 9, further comprising the engine configured to achieve the first thermodynamic state when the intake and exhaust valves are controlled to the high-lift valve open positions and the phasings of the intake and exhaust valves are controlled to the predetermined intake and exhaust cam phasing angles and configured to achieve the first thermodynamic state when the intake and exhaust valves are controlled to low-lift valve open positions and the phasings of the intake and exhaust valves are controlled to the predetermined intake and exhaust cam phasing angles.

12. An internal combustion engine, comprising:
   a combustion chamber;
   an intake valve and an exhaust valve associated with the combustion chamber;
   an intake camshaft having a high-lift intake lobe including a peak position and a low-lift intake lobe including a peak position, the peak positions rotationally separated by an intake lobe separation angle, wherein the peak position of the high-lift intake lobe is advanced relative to the peak position of the low-lift intake lobe;
   an exhaust camshaft having a high-lift exhaust lobe including a peak position and a low-lift exhaust lobe including a peak position, the peak positions rotationally separated by an exhaust lobe separation angle, wherein the peak position of the high-lift exhaust lobe is retarded relative to the peak position of the low-lift exhaust lobe;
   an intake valve lift control device for coupling one of the high-lift intake lobe and the low-lift intake lobe to the intake valve;
   an exhaust valve lift control device for coupling one of the high-lift exhaust lobe and the low-lift exhaust lobe to the exhaust valve;
   an intake camshaft phasing device configured to control intake camshaft phasing;
   an exhaust camshaft phasing devices configured to control exhaust camshaft phasing; and
   said intake lobe separation angle and said exhaust lobe separation angle configured such that
      when the intake valve lift control device couples the high-lift intake lobe to the intake valve and the exhaust valve lift control device couples the high-lift exhaust lobe to the exhaust valve, the engine is operated in a high valve lift positive valve overlap state,
      when the intake valve lift control device couples the low-lift intake lobe to the intake valve and the exhaust valve lift control device couples the low-lift exhaust lobe to the exhaust valve, the engine is operated in a low valve lift negative valve overlap state, and
      when the intake and exhaust camshafts are at identical predetermined intake and exhaust camshaft phasing angles, a thermodynamic state established within the combustion chamber corresponding to the high valve lift positive valve overlap state and a thermodynamic state established within the combustion chamber corresponding to the low valve lift negative valve overlap state are substantially equivalent.

13. The internal combustion engine of claim 12, further comprising:
   a control module configured to transition operating the engine between the high valve lift positive valve overlap state and the low valve lift negative valve overlap state when the intake and exhaust camshafts are at the identical predetermined intake and exhaust camshaft angles.

* * * * *